United States Patent [19]

Mennell

[11] Patent Number: 4,555,602
[45] Date of Patent: Nov. 26, 1985

[54] DRAW OUT SWITCHGEAR AND OPERATING MECHANISM

[75] Inventor: Thomas W. Mennell, Scarborough, England

[73] Assignee: Y.S. Securities Limited, England

[21] Appl. No.: 602,987

[22] Filed: Apr. 23, 1984

[30] Foreign Application Priority Data

Apr. 22, 1983 [GB] United Kingdom ............... 8311063
Aug. 17, 1983 [GB] United Kingdom ............... 8322119

[51] Int. Cl.$^4$ .............................................. H01H 9/20
[52] U.S. Cl. .............................................. 200/50 AA
[58] Field of Search ....................... 200/50 A, 50 AA; 361/331–345

[56] References Cited

U.S. PATENT DOCUMENTS 2,689,293  9/1954  Claybourn et al. ............. 361/336 X
3,790,861  2/1974  Sakats ........................ 200/50 AA X
3,974,348  8/1976  Lipschutz .................... 200/11 C X
4,017,698  4/1977  Kuhn et al. .................... 200/50 AA

FOREIGN PATENT DOCUMENTS

1806152  5/1970  Fed. Rep. of Germany .
1234716  6/1971  United Kingdom .

Primary Examiner—J. R. Scott
Attorney, Agent, or Firm—Sughrue, Mion, Zinn, Macpeak, and Seas

[57] ABSTRACT

An electrical assembly, for example for use in low voltage supply distribution, comprises a fixed casing (4) for each of three phases. A pair of fixed contacts (e.g. 11, 12) are spaced apart within the casing and set back from an opening into the casing. A fuse carrier (29) is mounted for rectilinear sliding movement within the casing between a first position adjacent to the opening and a second position. In the second position movable contacts (30, 31) on the carrier engage the fixed contacts to close a circuit therebetween. A drive unit (50) is provided for mechanically driving the carrier between the two positions, the drive unit being a self-contained mechanism comprising a housing and a drive member movable relative thereto. The drive member can be detachably coupled to the contact carrier, and means (58, 60) provided for releasably locking the drive housing to the fixed casing. Thus, the drive unit is a separate entity from the contact assembly and can be used as required to drive any selected contact carrier.

13 Claims, 10 Drawing Figures

DRAW OUT SWITCHGEAR AND OPERATING MECHANISM

BACKGROUND OF THE INVENTION

This invention relates to electrical assemblies and to drive means for a movable structure therein. The invention is particularly applicable to low voltage distribution and supply networks incorporating fuse and/or switch means.

In the particular context of low voltage supply distribution from indoor and outdoor sub-stations the network incorporates a fuse board, fuse pillar or fuse cabinet as appropriate to the particular environment. Conventionally, four or five supply bus bars are provided, one for each of the three phases and either a common neutral/earth bar or separate neutral and earth bars. Each three-phase output taken from the supply has each power-carrying cable connected to the bus bar of the respective phase by way of a fuse, the three fuses being mounted together on a distributor unit. Each fuse is designed to engage and bridge two spaced contacts, one electrically connected to the respective bus bar, and the other to the respective output.

In distribution arrangements of this type manufactured to conform to the requirements of the British Electricity Supply Industry Standard, each pair of fuse contacts is fully exposed when not bridged by their associated fuse. The contacts are bridged by engaging the fuse with one of the contacts and, pivoting about the point of engagement, driving the fuse manually into engagement with the other contact. A fuse holder may be permanently or detachably connected to the fuse, the operator then grasping the fuse holder rather than the fuse itself. Speed and firmness are necessary if safe fuse insertion is to be achieved when the bus bar is live. This is particularly so if there should be a fault condition on the output line, as severe arcing is liable to take place, with consequent hazard to the operator. Removal of a fuse from a live circuit requires a similar firmness of action and can again be dangerous. These hazards of operation, coupled with the exposure of potentially live contacts when fuses are not present render this type of distribution equipment dangerous.

On the continent of Europe equivalent distribution equipment does provide for shrouding of the contacts when the fuse is not in position, and also includes shrouding to direct arcing away from an operator inserting or removing the fuse, and means to assist in quenching arcs. Nevertheless, there is potential danger, and safe operation still depends on the speed and firmness of the operator while manually removing or inserting fuses.

In other types of distribution equipment insertion and removal of fuses may be assisted by a mechanism permanently associated with each fuse and controllable to effect the necessary operation. Although providing increased operator safety such equipment is expensive.

The present invention seeks to improve the safety and economy of distribution assemblies as aforesaid, and is also applicable to the operation of fuses and/or switches in other types of electrical assembly.

SUMMARY OF THE INVENTION

According to the invention an electrical assembly comprises a fixed casing with an opening into the casing, a pair of fixed contacts spaced apart within the casing and set back from the opening into the casing; a structure forming a contact carrier carrying a pair of movable contacts thereon; cooperating guide means on the casing and the contact carrier for guiding the contact carrier to move within the casing along a rectilinear path between a first position adjacent to the opening, in which position the movable contacts are spaced from the fixed contacts, and a second position in which the movable contacts engage the fixed contacts to close a circuit therebetween; a drive unit for mechanically driving the carrier between the two positions, the drive unit being a self-contained mechanism and comprising a housing and a drive member movable relative thereto; means for detachably coupling the drive member to the contact carrier; and means for releasably locking the drive housing to the fixed casing.

Such an assembly provides effective shrouding of the fixed contacts by setting these back within the casing from the opening, so materially reducing the possibility of them being touched by an operator. Furthermore, by providing for mechanical driving of the movable contact carrier the operator is further removed from the proximity of the fixed contacts during operation of the contact carrier. The arrangement is thus considerably safer than those previously used.

Use of a detachable, self-contained drive unit leads to further advantage in both cost and security. Thus, a single drive unit can be used in sequence for moving a number of contact carriers, rather than supply each carrier with its own dedicated drive mechanism. If the drive unit is kept secure when not in use then unauthorised operation can be prevented.

Preferably, the cooperating guide means comprise slideway means extending from the opening towards the fixed contacts on inner surfaces of walls of the casing, and slide means on the contact carrier and engaged with the slideway means.

The contact carrier may simply carry directly connected contacts for bridging the fixed contacts and thus act as a switch. In this case, the pair of fixed contacts will comprise an input and an output contact, and the output contact may be connected through a fuse to an output line. In an alternative, connection from the output side of the fuse to the output line may also be by way of bridging contacts also carried by the carrier, so that the circuit is switched on both sides of the fuse.

In another embodiment, preferred for many applications, the contact carrier will also carry a cartridge fuse electrically connected between the movable contacts.

The assembly may incorporate interlock means preventing movement of the carrier between the two positions unless the interlock means are released. Release of the interlock means may conveniently be effected by proper positioning of the drive unit so that the carrier can only be moved through proper use of such drive unit. A further interlock may prevent operation of the drive unit unless properly positioned on the assembly.

The invention also extends to a self-contained drive unit capable of use in the assembly as aforesaid. Such drive unit is capable of attachment to a structure designed to be driven in either direction between two fixed positions, and the drive unit comprises a housing; a drive member movable relative to the housing from any one of a plurality of positions of rest to any adjacent one of said plurality of positions; means for detachably coupling the drive member to the structure when the drive member is in a position of rest; an.d a drive mechanism acting between the housing and the drive member and capable of driving the drive member from any one of the positions of rest through an equal movement in either selected one of two opposite senses to finish movement in an adjacent one of the positions of rest.

In the particular context of an assembly according to the invention, the structure to which the drive unit may be detachably coupled is of course the contact carrier.

It will be understood that the casing will normally house three pairs of fixed contacts, one pair for each phase of an alternating current supply. A movable contact carrier, usually a fuse carrier, will be associated with each pair of fixed contacts. A self-contained drive unit can then be used in turn to drive each carrier from its first to its second position or vice versa. Usually a bank of casings will be provided on a fuse board, fuse pillar or fuse cabinet, a single drive unit being provided for the bank to be used as desired. The drive unit may be connected to earth by a wander lead, which not only increases safety but also prevents the drive unit from being improperly taken from the assembly.

The invention will be better understood from the following description of specific embodiments of assemblies in accordance therewith, given by way of example only, with reference to the accompanying drawings.

DESCRIPTION OF THE PREFERRED EMBODIMENTS

Figure 1:
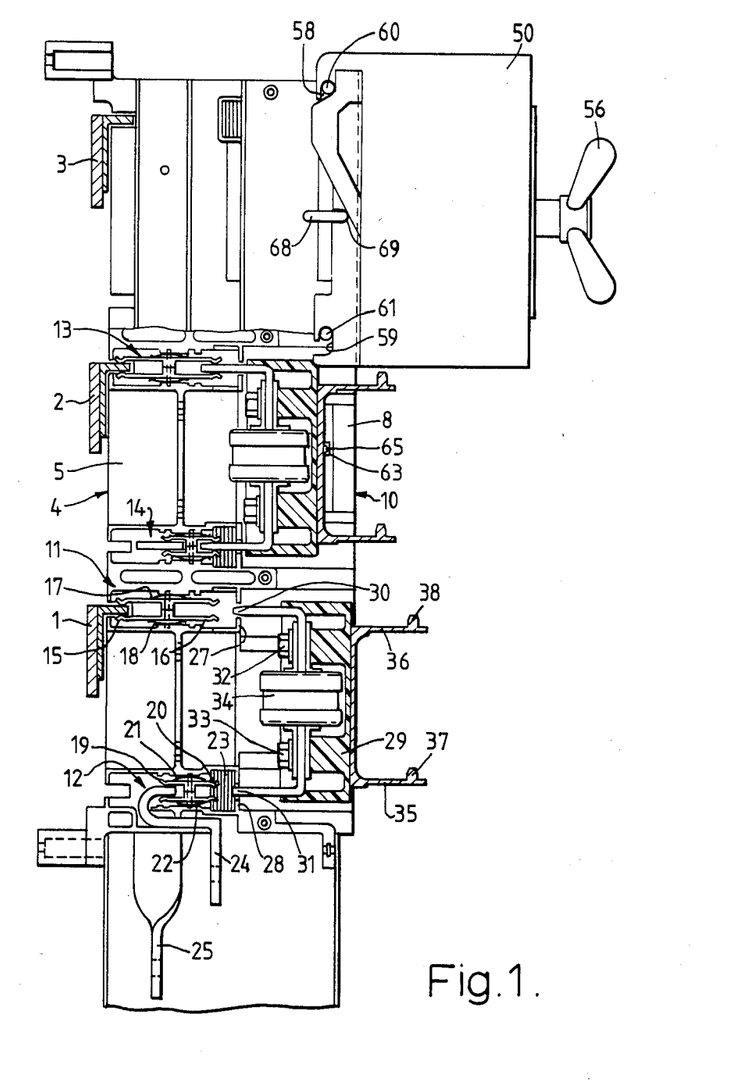
FIG. 1 is a side view, partly sectioned, of a first embodiment of assembly.
Figure 2:
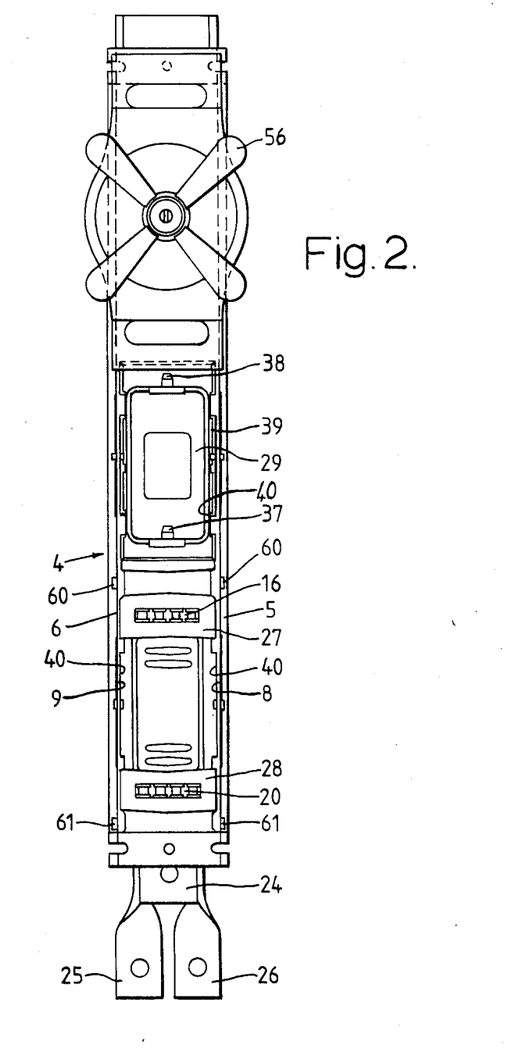
FIG. 2 is a front view of the assembly of FIG. 1.
Figure 3:
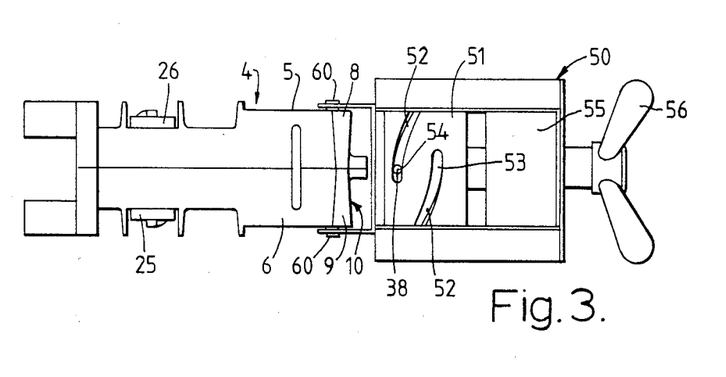
FIG. 3 is a plan view of the assembly of FIG. 1.

FIGS. 1 to 3 show a three-phase outlet assembly capable of being mounted in a fuse board, fuse pillar, fuse cabinet or similar installation, the installation including three bus bars 1 to 3, one for each phase of a supply. The assembly includes a casing, shown generally as 4, made up of two similar plastics moulded sections 5, 6 secured together in any suitable manner. Each section 5, 6 has a part defining a wall 8, 9 respectively, the wall terminating at an opening 10 into the casing.

The casing sections locate between them three pairs of fixed contact assemblies. Thus, input and output contact assemblies 11, 12 are positioned in the lowermost part of the casing in association with the bus bar 1, input and output contact assemblies 13 and 14 are positioned in the centre part of the assembly for association with the bus bar 2, and input and output contact assemblies similar to the assemblies 13, 14 are mounted in the upper part of the casing for association with the bus bar 3. The three input contact assemblies are identical and, for example, assembly 11 comprises contact sections 15 capable of gripping the bus bar 1 and fixed contact sections 16. Leaf springs 17, 18 bias the opposed members of each contact set together. The three output contacts are also identical to each other in construction, and thus contact assembly 12 comprises contact sections 19 and fixed contact sections 20, opposed members in the set being biased together by leaf springs 21, 22. The contact sections 20 have an associated arc-quenching arrangement 23. The contact sections 19 engage a first outlet conductor 24, while similar contact sections of the other two output contact assemblies are in contact with output conductors 25, 26 respectively.

The assembly as thus far described is securely mounted on the fuse board or other installation. It will be seen that the two fixed contact sections 16, 20 for each of the three phases are well shrouded by being set back from the opening 10 into the casing, and further by additional shrouding 27, 28 moulded into the two casing sections. Accidental touching of the contacts by an operator is thus virtually impossible.

In order to connect the supply bus bars 1 to 3 to the respective output conductors 24 to 26 it is usual for the fixed contacts 16 and 20 of each phase to be bridged by a fuse. The lowermost phase of FIG. 1 is shown with a fuse fitted, but in the open position, the centre phase of FIG. 1 and of FIG. 2 is shown with a fuse fitted and in a closed position, while the lower phase of FIG. 2 is shown without a fuse present. Each fuse comprises a moulded fuse carrier 29, having contacts 30, 31 secured thereto by bolts 32, 33, the bolts also securing between the contacts a cartridge fuse element 34. Each fuse carrier has two outwardly projecting stems 35, 36 each fitted with an upstanding pin 37, 38 respectively. Each side of each fuse carrier is formed with a slide 39, each slide engaging a matching slideway 40 moulded on the inner surface of the respective walls 8, 9 of the casing and extending from the opening 10 towards the fixed contacts. The slide and slideway arrangements locate and guide each fuse carrier along a rectilinear path so that the movable contacts thereon are properly aligned to move into and out of engagement with the fixed contacts 16, 20.

Figure 4:
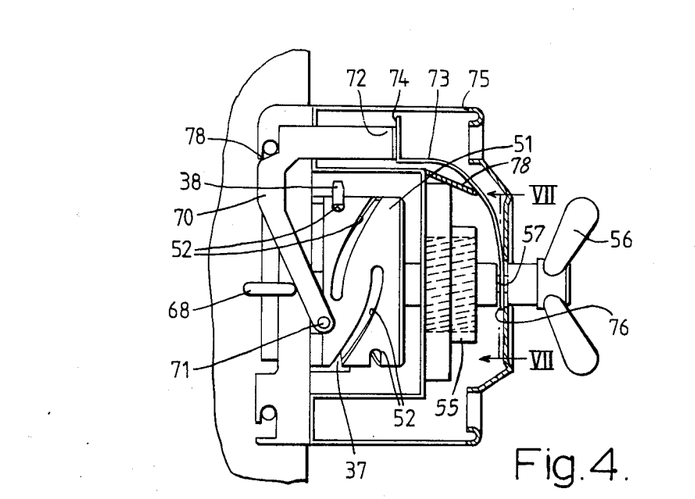
FIG. 4 is a sectional scrap view showing a drive unit in position.
Figure 4A:
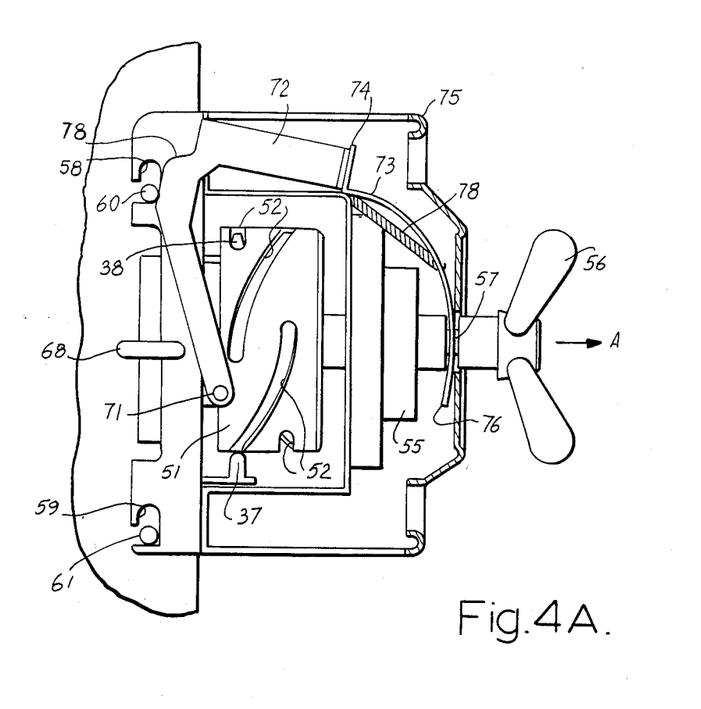
FIG. 4a is a sectional scrap view showing a drive unit in a lifted position.
Figure 5:
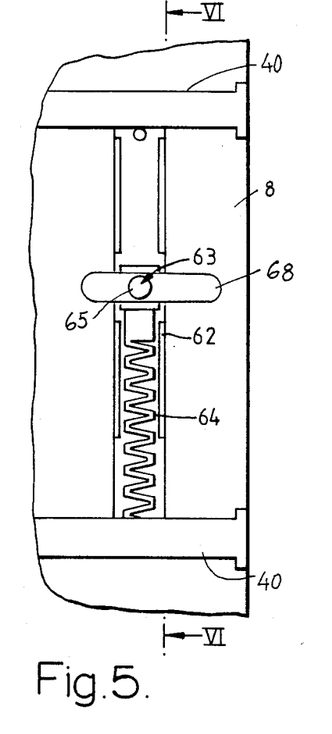
FIG. 5 is an enlarged view of part of one side wall of the assembly.
Figure 6:
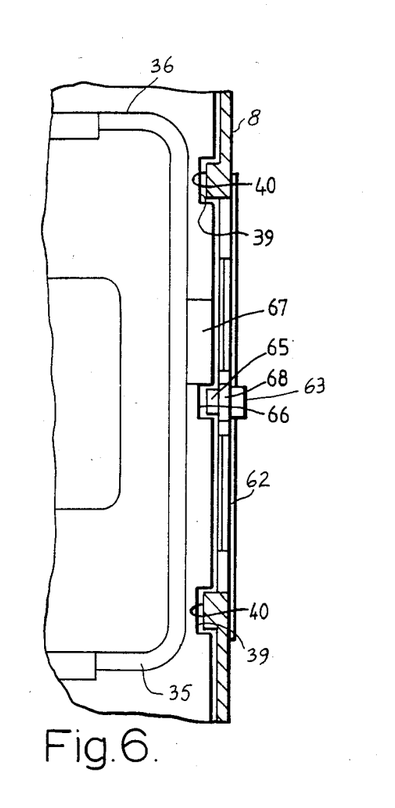
FIG. 6 is a section on line VI—VI of FIG. 5.
Figure 7:
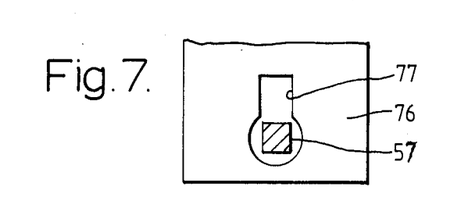
FIGS. 7 and 7a are a part section on lines VII—VII of FIGS. 4 and 4a, respectfully.
Figure 7A:
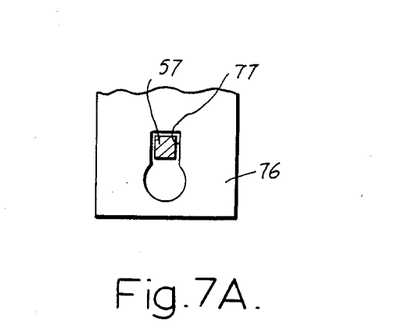

Each fuse carrier is designed to be moved between its open and closed positions by a self contained drive unit shown in position on the uppermost phases of FIGS. 1 and 2 and also shown in FIGS. 3 and 4. The drive unit comprises a housing 50 within which is rotatably mounted a circular-cylindrical sleeve 51 having four cam grooves 52. formed therein. Each cam groove extends for slightly more than 90° around the circumference of the sleeve 51. Each cam groove has an operative starting point 53 and an operative finishing point 54 spaced apart by 90°, the starting points 52 of all the grooves lying in a first plane extending perpendicular to the sleeve axis, and the finishing points 54 of all the grooves lying in a second plane parallel to the first plane. The starting point 53 of one groove and the finishing point 54 of the next adjacent groove lie in a common axial plane. A coil spring mechanism is contained within a case 55 and is controlled by an operating member 56 driving the mechanism by way of a square-section shaft 57. The spring mechanism as such is known, and a suitable mechanism is supplied by IMI Santon Ltd. of Somerton Works, Newport, Gwent, under the designation Santon Snap-Action Mechanism SC2/3034/TB3/HR1. The mechanism operates so that rotation of the operating member in either sense serves to charge one or the other of two coil springs, which when fully charged is automatically released by stop means, and on release causes rotation of the sleeve 51 in the same sense as that in which the operating member was moved during charging. The mechanism is such that movement of the operating member in either sense of rotation can be accommodated and will result in driving the sleeve in the appropriate sense. Thus, the mechanism does not need resetting between successive operations.

In order for the fuse carrier to be driven by the drive unit it is necessary for the drive unit to be fitted properly to the assembly. This engaged position is shown in the upper phase of FIG. 1 and in FIGS. 3 and 4. From these it will be seen that each side of the housing 50 is provided with upper and lower locating slots 58, 59 engageable respectively with upper and lower locating dowels 60, 61. The lower locating dowels at each phase also form the upper locating dowels for the phase immediately below. When the slots are fully engaged with the dowels the pins 37 and 38 engage diametrically opposed operative finishing or starting points of two of the cam grooves 52 in the sleeve 51. Thus, engagement of the pins with the cam grooves detachably couples the drive sleeve 51 to the contact carrier and the engagement of the grooves and the dowels releasably lock the drive housing to the fixed casing.

In order to ensure that the fuse carrier cannot inadvertently be moved between its open and closed positions unless the drive unit is present an interlock arrangement is provided. For each phase, each side of the casing is provided with a guideway 62 in which a locking member 63 is guided for vertical sliding movement. Each locking member is biased to an uppermost position by a compression spring 64. The locking member 63 has a projection 65 capable of lying in alignment either with an opening 66 in the side of the fuse carrier or a projection 67 above that opening. When aligned with the opening 66 the fuse carrier is free to move between its open and closed positions, when the projections 65 and 67 are in alignment the locking member prevents such movement of the fuse carrier, as will be apparent from the centre phase of FIG. 1. The locking member includes a cross-piece 68 lying in a plane parallel to the walls of the casing, one end of the cross-piece being capable of reception in a groove 69 in the housing of the drive unit. With the unit properly fitted as shown in FIG. 1 the locking member 63 lies in its lower position wherein projection 65 and opening 66 are aligned and the fuse carrier is free to move. On removal of the drive unit by lifting this upwards and then outwards from engagement with the dowels 60 and 61 the locking member 63 moves under the action of the biasing spring 64 to its upper position wherein projections 65 and 67 are aligned so preventing movement of the fuse carrier.

The drive unit also incorporates an interlock device designed to ensure that the unit cannot be operated while improperly attached to the assembly. At each side of the housing 50 there is provided an interlock arm 70 pivoted to the housing at 71 about an axis lying below the axis of rotation of the sleeve 51. The two arms are secured at upper ends 72 to a plate 73 having an upper part 74 that can be manually engaged through an opening 75 in the top of the housing 50. The plate 73 terminates in a lower extension 76 formed with a key-hole slot 77 A tension spring 78 biases the plate and arms into the positions shown in FIG. 4, in which the square shaft 55 lies within the part-circular section of the key-hole slot and is thus free to rotate. In this position, it will be seen that shoulders 78 of the arms 70 lie adjacent to the upper dowel 60 and effectively lock the drive unit against inadvertent release from those dowels. In order to remove the drive unit it is necessary to grasp the part 74 and pull the plate and arms towards the operating member 56, during which movement the square-section shaft 57 moves into the rectangular section of the key-hole slot 77 so preventing rotation of this shaft and thus operation of the drive unit. The plate and arms similarly need to be moved to enable the drive unit to be fitted to the casing.

In operation, if a fuse is to be fitted to any phase of the circuit the fuse is first manually placed in the position shown in the lowermost phase of FIG. 1, the slide and slideways being engaged, but further movement of the fuse towards the fixed contacts being prevented by the locking member 63. The drive unit is then fitted to the casing by moving the interlock arm 70 out of the way as described, engaging the slots 58 and 59 with the dowels 60 and 61 and lowering the drive unit on the dowels to the position shown in the upper phase of FIG. 1 and in FIG. 4. This causes the projection 65 of the locking member 63 to move into alignment with the opening 66, so allowing movement of the fuse carrier. The act of properly locating the housing of the drive mechanism with relation to the dowels also automatically correctly positions the cam grooves with respect to the pins 38 and 37 and engages those pins with starting points 53 of two diametrically opposite cam grooves.

The drive unit is then operated to charge the appropriate coil spring and release it to drive the sleeve 51 clockwise as seen in FIG. 2, the rotary movement being translated by the cam arrangement into a linear movement of the fuse carrier towards the fixed contacts so that the fuse carrier contacts are driven into electrical engagement with the fixed contacts After releasing the interlock arms 70 the drive unit can then simply be lifted and withdrawn from its operative position, the locking member 63 then preventing withdrawal of the fuse carrier. It will be seen that the operator's hand is well removed from the actual region of engagement between the fuse carrier contacts and the fixed contacts so that he is well protected from the effects of any arcing. Additional protection is afforded by proper shaping of the housing so that arcing products are exhausted out of the rear and the side of the housing rather than the front. Furthermore, the mechanical spring action and the positive guiding of the fuse ensure that the electrical engagement is made rapidly and firmly, so mitigating the effects of any fault condition. If a fuse carrier is to be removed from the engaged position the operation is simply repeated, but in this instance the finishing point of two opposite cam grooves are engaged over pins 38 and 37 and the sleeve 51 is rotated anti-clockwise so that the carrier is withdrawn to the off position.

Safety of operation is enhanced by the interlocks. It will be appreciated thatif for some reason full engagement or withdrawal of the fuse carrier has not occurred on operation of the actuator then it will not be possible to remove the drive unit since the cross member 68 of the locking member will prevent the drive unit from being lifted from its engaged position. Warning is thus given of a fault condition.

It will be seen that the form of the cam grooves 52, and the positive driving of the sleeve through 90° on every operation, ensures that the sleeve can always be suitably engaged with the pins 37, 38 of a fuse carrier whether that carrier is in the closed or open position. No resetting of the drive mechanism between successive driving operations in either direction is necessary. It is not necessary to use four cam grooves to achieve this result and any desired number (n) can be used so long as the operative starting points of all grooves lie in one common radial plane, the operative finishing points of all grooves lie in a second common radial plane, the operative starting point of one groove and finishing point of the immediately adjacent groove lie in a common axial plane, and the angle of rotation of the sleeve for each operation is 360/n.

It will be appreciated that only a single drive unit need be provided for an installation comprising a number of housings, each providing a three-phase outlet. Some part of the framework on which the bus bars are supported is usually earthed and the drive unit can conveniently be connected to earth by a wander lead of sufficient length as to allow the unit to be engaged with a fuse carrier in any required position. Apart from the added safety provided by the earthed connection a wander lead prevents the drive unit from being improperly removed from that installation.

Figure 8:
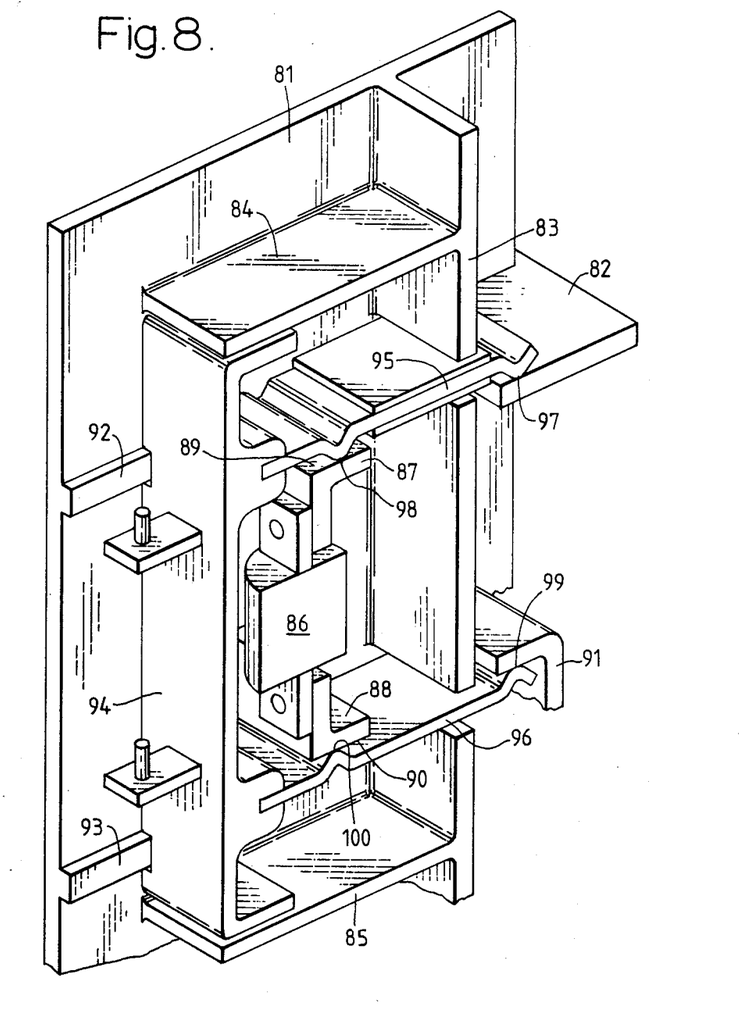
FIG. 8 is a fragmentary view of part of a second embodiment of assembly.

FIG. 8 shows a broken-away view of part of one phase of an alternative assembly, broadly similar in layout to the assembly of FIGS. 1 to 3. An insulated moulded casing 81, of which only one internal face is shown, supports a plurality of vertically spaced bus bars such as 82, each bus bar lying behind a wall section joining the two side plates of the casing. Upper and lower forward extensions 84, 85 from the wall section 83 define a compartment in which is mounted a fuse 86 joining contact sections 87, 88 secured in position within the housing. An upper part 89 of contact section 87 is coplanar with the upper surface of bus bar 82. A lower part 90 of contact section 88 is coplanar with part of an output conductor 91, also supported by the casing.

The inner surfaces of the opposed walls of the casing each have upper and lower slideways 92, 93, and an insulating carrier 94 is movable on the slideways into and out of the compartment containing the fuse. The carrier carries upper and lower conductive strips 95, 96. The strip 95 has contact sections 97, 98 engageable respectively with the bus bar 82 and the part 89 to close a circuit therebetween when the carrier is in the position shown. The strip 96 has contact sections 99, 100 engageable respectively with the part 90 and output conductor 91 when the carrier is in the position shown. Thus, the output conductor is connected to the bus bar through the fuse. On movement of the carrier to the left as shown in FIG. 8, the circuit is broken on each side of the fuse. The carrier for each individual phase may be driven between its two positions by a drive mechanism similar to that described.

In some installations it is only necessary to switch on the output side of the fuse, and in such case the contact section 88 is in fact the upper part of the output conductor, and the lower strip 96 and its contact is omitted from the carrier.

It will be understood that many modifications can be made to the units as described. The drive unit shown is designed to drive the carrier at two points equally spaced to the centre of the carrier so providing a balanced drive that does not induce the carrier to twist on the slide way. Alternatively a single drive point at the centre of the carrier could be used. Rather than drive each carrier separately the three carriers associated with the three phases of a single output may be mounted together as a common assembly, and the drive unit used to drive that assembly so that all three carriers are inserted or removed simultaneously. Drive units other than that described may be used, and changes may also be made to the casing, fixed contact arrangements and interlock means.

What we claim is:

1. An electrical assembly comprising a fixed casing with an opening into the casing; a pair of fixed contacts spaced apart within the casing and set back from the opening into the casing; a structure forming a contact carrier carrying a pair of movable contacts thereon; cooperating guide means on the casing and the contact carrier for guiding the contact carrier to move within the casing along a rectilinear path between a first position adjacent to the opening, in which position the movable contacts are spaced from the fixed contacts, and a second position in which the movable contacts engage the fixed contacts to close a circuit therebetween; a manually portable drive unit for mechanically driving the carrier between the positions, the drive unit being a self-contained mechanism that is mountable on the casing to lie outside thereof and that is demountable from the casing; the drive unit comprising a drive housing; means for releasably locking the drive housing to the fixed casing against relative movement thereto when the drive unit is mounted on the casing; a drive member movable relative to the drive housing and means for detachably coupling the drive member to the contact carrier when the drive unit is mounted on the casing.

2. An electrical assembly according to claim 1 in which the cooperating guide means comprise slideway means extending from the opening towards the fixed contacts on inner surfaces of walls of the casing, and slide means on the contact carrier and engaged with the slideway means.

3. An electrical assembly according to claim 1 in which the contact carrier carries a cartridge fuse electrically connected between the movable contacts.

4. An electrical assembly according to claim 1 in which the movable contacts are directly connected contacts for bridging the fixed contacts when the carrier is in the second position, the fixed contacts comprise an input contact and an output contact, and the casing supports a fuse between the output contact and an output line.

5. An electrical assembly according to claim 1 and incorporating interlocking means mounted on the casing and movable between a locking position wherein movement of the carrier between the first and second positions, and a release position, wherein said movement is allowed.

6. An electrical assembly according to claim 1 in which the drive member is movable relative to the housing of the drive unit from any one of a plurality of positions; wherein said means for detachably coupling the drive member to the contact carrier provides for coupling a detachment only when the drive member is in a position of rest; and the drive unit includes a drive mechanism acting between the housing and the drive member and capable of driving the drive member from any one of the positions of rest through an equal movement in either selected one of two opposite senses to finish movement in an adjacent one of the positions of rest.

7. Apparatus according to claim 6 in which the drive member is rotatable relative to the housing from one position of rest to an adjacent position of rest, and comprises a circular-cylindrical member having a plurality of cam means formed around the circumference thereof and each subtending an equal angle to the axis of the cylindrical member, which is also the axis of rotation, the cam means being detachably couplable to the contact carrier by lowering the cam means onto cam followers which are carried by and project upwardly from a part of the contact carrier, each cam means having an operative starting point lying in a first plane extending radially of the cylindrical member and common to the operative starting points of all the cam means, and an operative finishing point lying in a second plane parallel to and axially spaced from the first plane and common to the operative finishing points of all the cam means, the operative finishing point of the immediately adjacent cam means lying in a common plane extending axially of the cylindrical member; and the drive mechanism is operative to rotate the cylindrical member either clockwise or anti-clockwise as selected, from each position of rest through an angle equal to said subtended angle to finish in a position of rest adjacent to the starting position.

8. Apparatus according to claim 7 in which the cam means comprise four cam grooves formed through the circular-cylindrical member and each subtending an angle of 90° to the axis thereof.

9. Apparatus according to claim 7, in which the drive unit includes an operating member and chargeable spring means between the operating member and the drive member, rotation of the operating member in either sense serving to charge the spring means, the spring means being releasable when charged to drive the drive member in the same sense as the operating member was moved during charging.

10. A self-contained drive unit capable of attachment to a structure designed to be driven in either direction between two fixed positions, the drive unit comprising a housing; a drive member movable relative to the housing from any one of a plurality of positions of rest to any adjacent one of said plurality of positions; means for detachably coupling the drive member to the structure when the drive member is in a position of rest; and a drive mechanism acting between the housing and the drive member and capable of driving the drive member from any one of the positions of rest through an equal movement in either selected one of two opposite senses to finish movement in an adjacent one of the positions of rest.

11. Apparatus according to claim 10 in which the drive member is rotatable relative to the housing from one position of rest to an adjacent position of rest, and comprises a circular-cylindrical member having a plurality of cam means formed around the circumference thereof and each subtending an equal angle to the axis of the cylindrical member, which is also the axis of rotation, the cam means being detachably couplable to the structure by way of cam followers on the structure, each cam means extending radially of the cylindrical member and common to the operative starting points of all the cam means, and an operative finishing point lying in a second plane parallel to and axially spaced from the first plane and common to the operative finishing points of all the cam means, the operative starting point of each cam means and the operative finishing point of the immediately adjacent cam means lying in a common plane extending axially of the cylindrical member; and the drive mechanism is operative to rotate the cylindrical member either clockwise or anticlockwise as selected, from each position of rest through an angle equal to said subtended angle to finish in a position of rest adjacent to the starting position.

12. Apparatus according to claim 11 in which the cam means comprise four cam grooves formed through the circular-cylindrical member and each subtending an angle of 90° to the axis thereof.

13. Apparatus according to claim 11 in which the drive unit includes an operating member and chargeable spring means between the operating member and the drive member, rotation of the operating member in either sense serving to charge the spring means, the spring means being releasable when charged to drive the drive member in the same sense as the operating member was moved during charging.

* * * * *